(No Model.) 4 Sheets—Sheet 1.

R. H. LITTLE.
LIQUID DISPENSING APPARATUS.

No. 481,698. Patented Aug. 30, 1892.

Witnesses:
Fred Gerlach
J. B. Carpenter

Inventor:
Robert H. Little
By Price & Fisher
Attorneys.

(No Model.) 4 Sheets—Sheet 2.

R. H. LITTLE.
LIQUID DISPENSING APPARATUS.

No. 481,698. Patented Aug. 30, 1892.

Witnesses:
Fred Gerlach
J. B. Carpenter

Inventor:
Robert H. Little
By Bruce & Fisher
Attorneys.

(No Model.) 4 Sheets—Sheet 3.

R. H. LITTLE.
LIQUID DISPENSING APPARATUS.

No. 481,698. Patented Aug. 30, 1892.

Witnesses:
Fred Gerlach
I. B. Carpenter

Inventor:
Robert H. Little
By Price & Fisher
Attorneys.

(No Model.) 4 Sheets—Sheet 4.
R. H. LITTLE.
LIQUID DISPENSING APPARATUS.
No. 481,698. Patented Aug. 30, 1892.
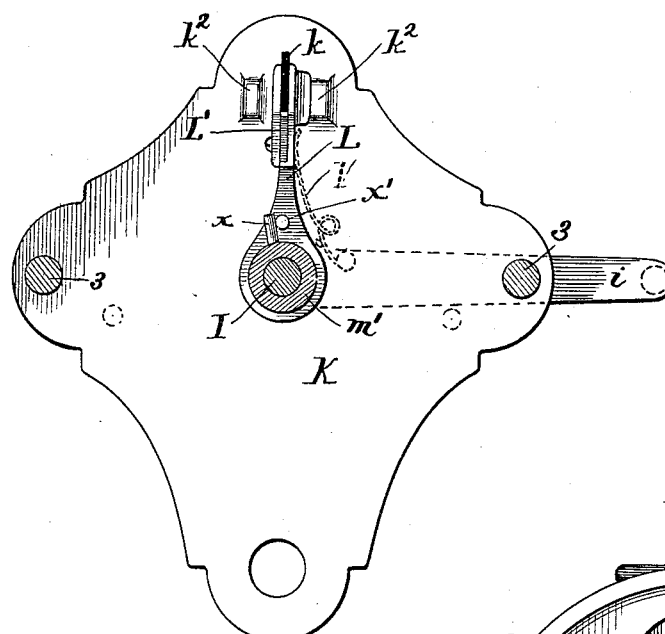
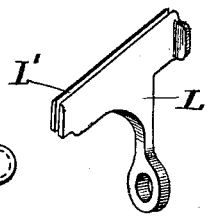
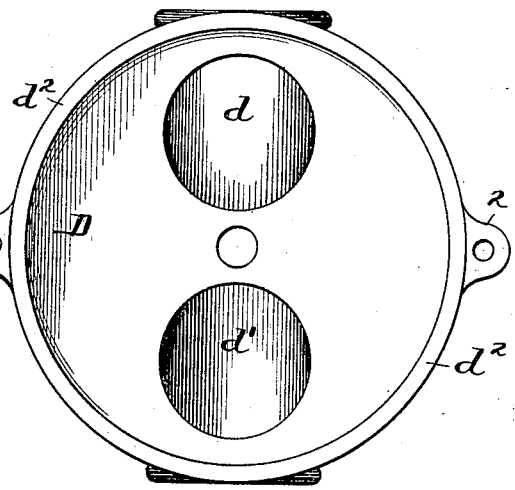
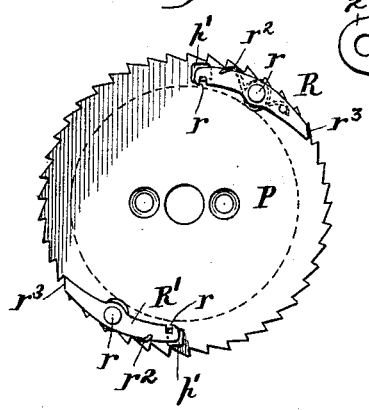
Witnesses:
Fred Gerlach
J. B. Carpenter
Inventor:
Robert H. Little
By Pierce & Fisher
Attorneys.

UNITED STATES PATENT OFFICE.

ROBERT H. LITTLE, OF CHICAGO, ILLINOIS, ASSIGNOR OF TWO-THIRDS TO HENRY H. HEIMERDINGER AND ISAAC MEYER.

LIQUID-DISPENSING APPARATUS.

SPECIFICATION forming part of Letters Patent No. 481,698, dated August 30, 1892.

Application filed June 22, 1891. Serial No. 397,154. (No model.)

*To all whom it may concern:*

Be it known that I, ROBERT H. LITTLE, residing at Chicago, in the county of Cook and State of Illinois, have invented certain new and useful Improvements in Liquid-Dispensing Apparatus Applicable in Part to other Purposes, of which the following is hereby declared to be a full, clear, and exact description, reference being had to the accompanying drawings, forming part of this specification.

My present invention has primarily for its object to provide an improved liquid-dispensing apparatus, and more especially to provide an apparatus whereby the discharge of the liquid can be effected by coin-controlled mechanism, so that when a coin of proper denomination has been deposited the apparatus can be operated to deliver a certain quantity of liquid. It will be understood, however, that certain features of my invention—such, for example, as the mechanism that serves to carry the coin and cause the same to render the apparatus operative—is applicable to a variety of other uses for which mechanism of this character is employed, and it will be understood, also, that the apparatus whereby the liquid is discharged in measured quantity can be used in connection with other forms of coin-controlled devices than those illustrated in the accompanying drawings.

Figure 1:
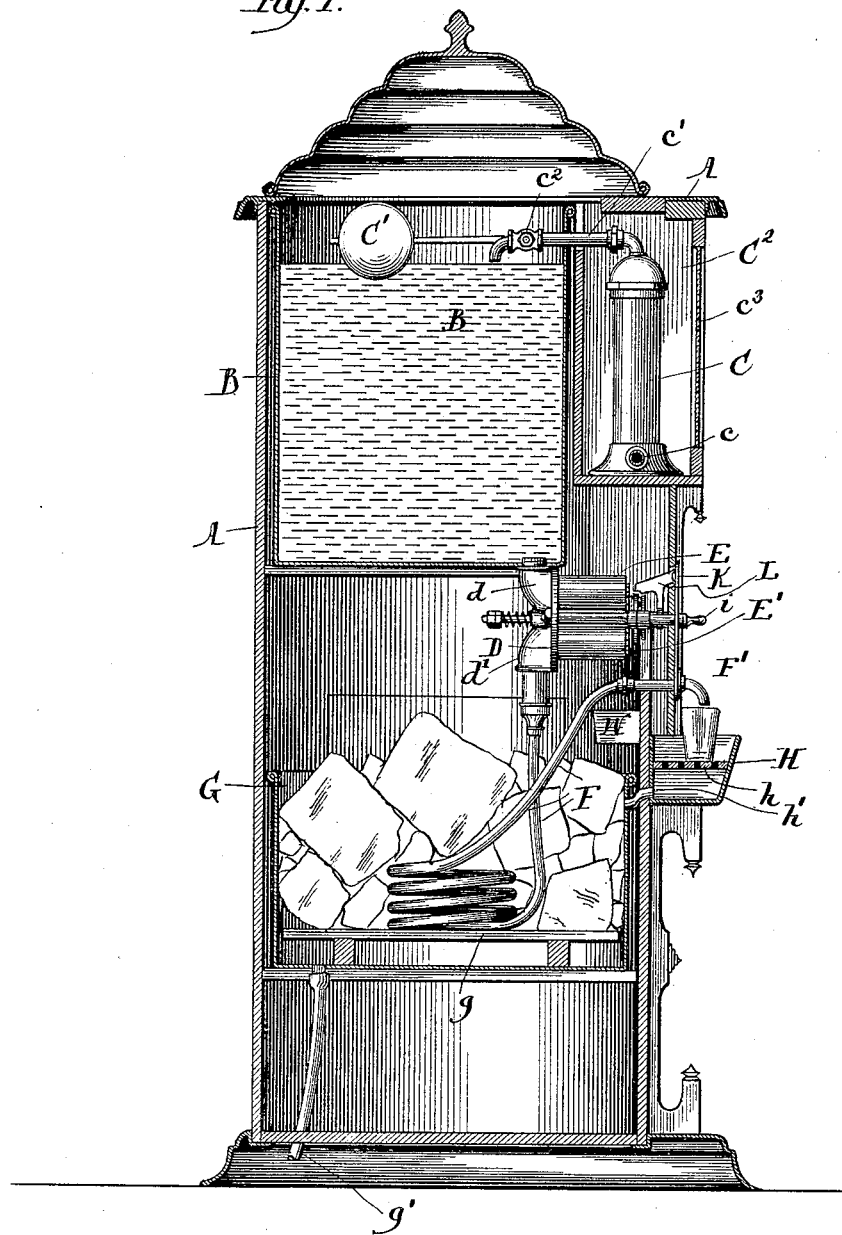
Figure 2:
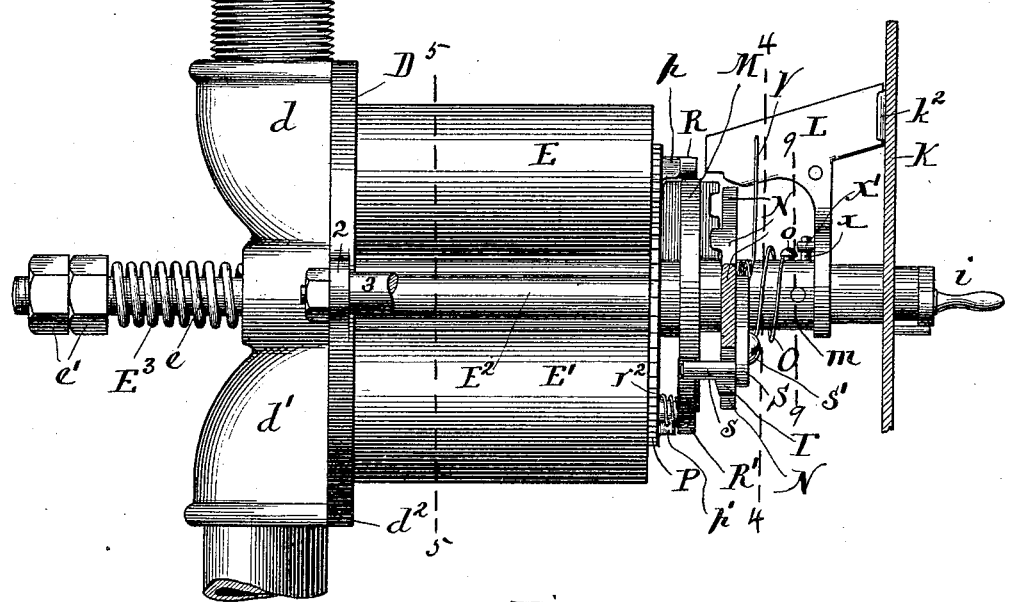
Figure 3:
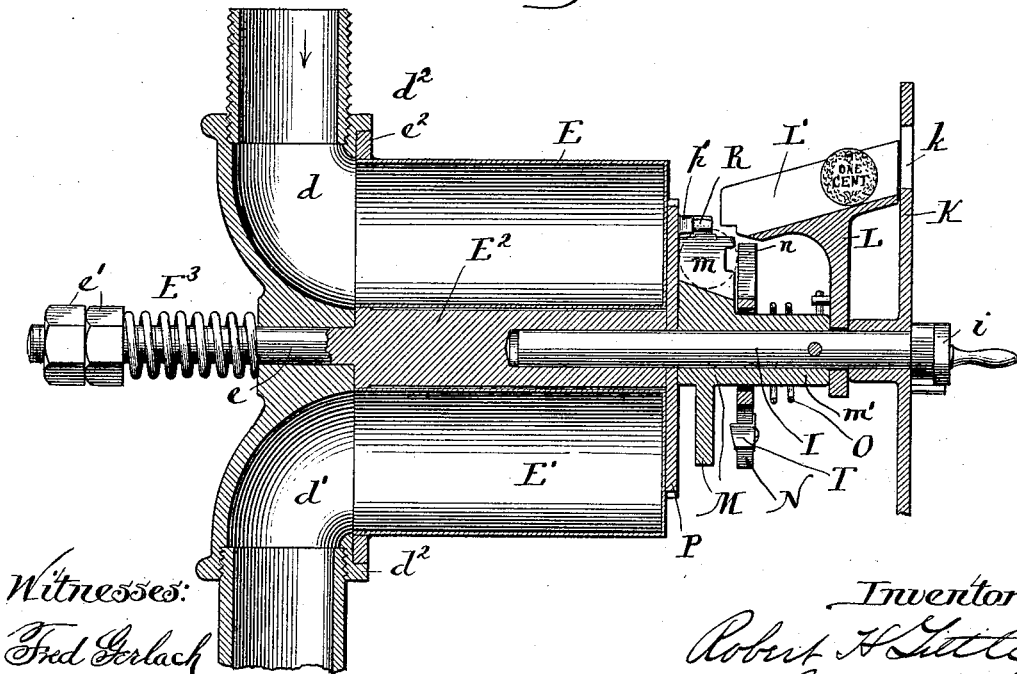
Figure 4:
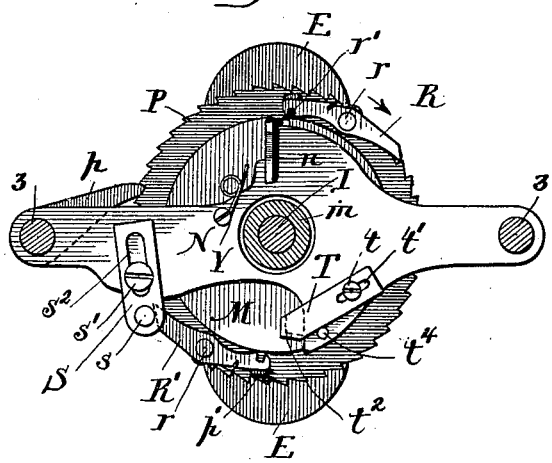
Figure 6:
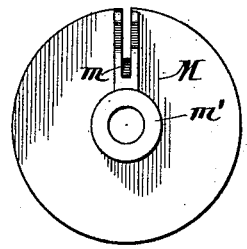
Figure 5:
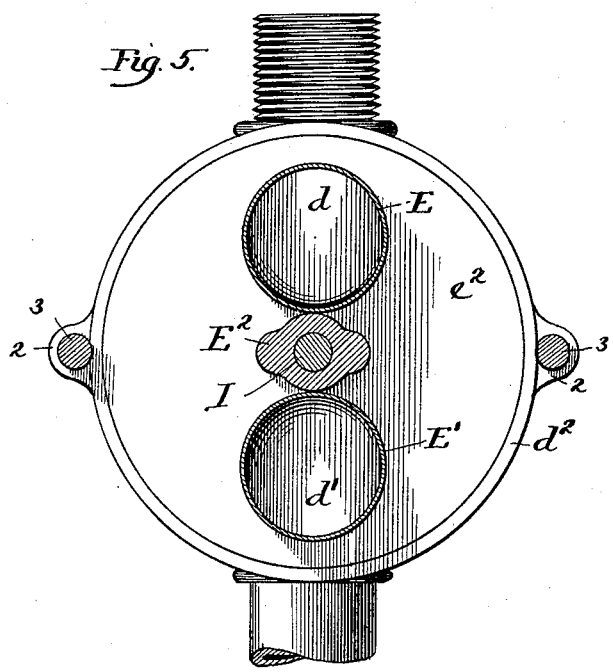
Figure 7:
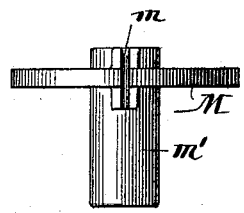
Figure 8:
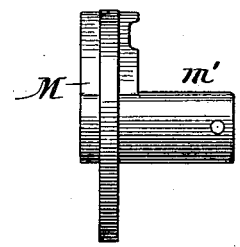

Figure 1 is a view in vertical section through the apparatus embodying my invention, parts being shown in side elevation. Fig. 2 is an enlarged detail view, in elevation, of the discharging-vessels and mechanism for controlling the same. Fig. 3 is a view in vertical longitudinal section of the parts shown in Fig. 2. Fig. 4 is a sectional view on line 4 4 of Fig. 2, parts being shown in elevation. Fig. 5 is a sectional view on line 5 5 of Fig. 2. Fig. 6 is a detail side view of the coin-carrier. Fig. 7 is a detail plan view of the coin-carrier. Fig. 8 is a detail side view of the coin-carrier. Fig. 9 is a view in section on line 9 9 of Fig. 2, looking toward the front of the machine. Fig. 10 is a detail view, in side elevation, of the ratchet-wheel and pawls. Fig. 11 is a detail perspective view of the shifting runway for the coin. Fig. 12 is a face view of the cover-plate for the discharge-vessel.

A designates the inclosing casing of the apparatus, and within the upper part of this casing is sustained the tank B, within which will be held the water or other liquid to be dispensed.

My present invention is shown as applied more particularly to the dispensing of pure water, and provision is therefore made for the filtering of the water before its delivery into the tank B. This filtering of the water is effected by means of a filter C, preferably of the type known as a "Pasteur" filter, to which the water-supply will be admitted by a port $c$, whence it will pass through a suitable pipe $c'$ to the tank B. The pipe $c'$ is provided with a valve or cock $c^2$, controlled by a float $C'$, the arm of this float being connected with the stem of the valve, in manner well understood in the art. By means of this float $C'$ and the valve $c^2$ the supply of water will be automatically cut off when the tank B is full. The filter C is preferably sustained within a compartment $C^2$, having a glass front $c^3$, which permits the ready inspection of the filter.

The lower portion of the vessel A is provided with a delivery-port, with which connects the short induction or delivery pipe or channel $d$ of the cover-plate D, against which will abut the open ends of the discharge-vessels E and E', by which the liquid will be drawn in measured quantity from the tank B. The cover-plate D is also furnished with a discharge pipe or channel $d'$, adapted to coincide with the open ends of the vessels E and E'.

The discharge-vessels E and E' are shown as two in number, although any desired number of such vessels may be employed. These vessels E and E' are sustained by a holder $E^2$, the stem $e$ of which projects through a central hub or opening in the cover-plate D and is encircled by a coiled spring $E^3$, that is held upon a stem $e$ by suitable nuts $e'$, this spring $E^3$ serving to hold the ends of the vessels E and E' snugly against the face of the cover-plate D. The plate D is preferably formed with an annular rib $d^2$ at its edge, against which will bear the flat portion $e^2$ of the holder $E^2$. Hence it will be seen that when the vessels are in the position illustrated in the drawings the supply of liquid will pass from the tank B and through the induction pipe or channel *d* into one of the discharge-vessels E, that is coincident with said pipe or channel *d*, and when by the rotation of the holder E² the vessels E and E' are rotated, so as to bring the vessel E coincident with the discharge pipe or channel *d'*, the supply of liquid within such vessel E will be discharged through said pipe or channel.

With the discharge pipe or channel *d'* is preferably connected a cooling-pipe F, that extends, by preference, in coiled form into an ice-tank G, the ice preferably resting upon a tray *g* and the drip-water being carried away from the bottom of the ice-tank by a suitable pipe *g'*. The opposite end of the cooling-pipe F is connected to a spout or faucet F', leading through the front of the inclosing casing, and from this spout will be received the liquid as it is dispensed.

By preference the front of the casing is provided with a tray H, having a false bottom *h*, on which will rest the glass to receive the liquid, and the bottom of this tray H is furnished with a discharge-pipe *h'*, whereby the waste-water will pass into the ice-tank G, whence it will be discharged through the pipe *g'*.

In order to effect the movement of the discharge-vessels E and E', I prefer to employ the mechanism next to be described. The central portion of the holder E² is bored out to receive an operating-rod I, the opposite end of this rod extending through the plate K at the front of the inclosing casing and there provided with a handle *i*, whereby the rod can be conveniently turned. Through the lugs 2 of the cover-plate D extend the tie-rods 3 of the cover-plate D, the ends of these tie-rods being suitably headed and provided with nuts to secure the parts firmly together. Upon the operating-rod is mounted a delivery-chute L, provided with a channel or runway L', adapted to be brought coincident with a slot *k* in the front plate K. On the rod I is also mounted a coin-carrier M, this carrier being fixed to the rod I to be turned therewith and being provided with a seat *m* to receive a suitable coin or check by which the apparatus is to be rendered operative. The coin-carrier M is preferably formed with a long hub *m'*, that passes through a fixed plate N, the ends of which are perforated to receive the tie-rods 3, and upon the hub *m'* of the coin-carrier is placed the coiled spring O, one end of which is connected, as at *o*, to the hub of the coin-carrier, while the opposite end is connected to the plate N, so that this spring tends to return the coin-carrier to the normal position whenever it is moved therefrom by the turning of the rod I. The fixed plate N is formed with a slot *n* opposite the seat of the coin-carrier, but the edge of the plate N overlaps the seat *m* of the coin-carrier, so that if the coin be not of the required thickness the inclined bottom of the seat *m* will cause the coin to roll through the slot *n* of the plate, whereas if the coin be of proper thickness the overlapping edge of the plate N will serve to retain the coin within the seat of the coin-carrier. To the holder E², by which the vessels E and E' are carried, is fixed a ratchet-wheel P, with the teeth of which engage the check-pawl *p*, that is pivoted upon the tie-rods 3, this pawl serving to guard the ratchet-wheel P, and consequently the vessels E and E', against backward movement. To the face of the ratchet-wheel P is also connected the coin-engaging dogs or pawls R and R', each of these dogs or pawls being pivoted, as at *r*, to the ratchet-wheel and being provided with a notch *r'*, with which the edge of the coin will engage. Upon the face of the ratchet-wheel P and opposite the notches *r'* of the pawls or dogs R R' are formed the lugs *p'*, the purpose of which will presently appear. Suitable springs *r²*, attached to the face of the ratchet-wheel P and encircling the pins *r*, upon which the pawls or dogs R are carried, force the dogs against the rim of the coin-carrier and hold the pawls or dogs in proper position to engage the coin within the seat of the coin-carrier. To the fixed plate N is attached a releasing-arm S, having an inwardly-projecting pin *s*, adapted to contact with the inclined ends *r³* of the dogs or pawls R R', this arm S being preferably connected to the fixed plate N by a set-screw *s'*, passing through a slot *s²* of the releasing-plate, so that the position of the releasing-plate can be adjusted to accurately time the release of the coin. Upon the fixed plate N is also held a check-pawl T, preferably of spring metal and connected to the plate N by a set-screw *t*, that passes through a slot *t'* of the pawl. The free end *t²* of the check-pawl T is bent inwardly and inclined, as seen in Fig. 3, and by preference the edge of the pawl T bears against a pin *t⁴*, projecting from the face of the plate N.

From the construction of parts, as thus far defined, the operation of my improved apparatus will be seen to be as follows: If a coin is inserted through the slot *k* of the plate K, it will roll down the channel L' until it falls into the seat *m* of the coin-carrier M. If the coin be of proper thickness, it will remain within the seat of the coin-carrier; but if it be thinner than a coin of proper denomination it will pass from the seat of the coin-carrier through the slot *n* of the fixed plate N and over into a tray or coin-box W within the main casing A. When a coin of proper denomination is thus within the seat of the coin-carrier, its upper edge will project slightly above the seat of the coin-carrier, and if now the handle *i* of the rod I be turned the coin-carrier will be rotated and will carry with it the coin until the coin rides against the lower edge of the pawl or dog R, slightly lifting this dog against the force of its spring until the edge of the coin passes into the seat or notch $r'$ of the dog. The continued turning of the handle $i$ and rod I and of the coin-carrier will by reason of the engagement of the coin with the pawl or dog R cause the rotation of the ratchet-wheel P and of the vessel-holder $E^2$ and vessels E and E′ until the vessel E, which is full of liquid, comes coincident with the discharge-channel $d'$, permitting the liquid to pass into the cooling-pipe F. This discharge of liquid into the cooling-pipe F will force the liquid previously delivered into said pipe to pass therefrom by way of the spout or faucet F′ into a suitable glass or receptacle. When the coin-carrier, the ratchet-wheel P, and the vessels have nearly completed their partial revolution incident to the turning of the handle $i$ and rod I, the inclined end $r^3$ of the pawl or dog R, that is in engagement with the coin, will contact with the pin $s$ of the releasing-arm S, and will be forced inward a sufficient distance to cause the opposite end of the dog or pawl R to pass from engagement with the coin, thereby permitting the coin to fall from the seat of the coin-carrier into the tray W. The check-pawl T will prevent the backward movement of the coin with the coin-carrier, and will cause the coin to be more certainly thrown from the seat of the coin-carrier as the latter is returned by the coiled reaction-spring O to its original position. It is manifest that as the coin-carrier M is thus returned by the coiled spring to its original position the pawl $p$ in engagement with the ratchet-wheel P will prevent the backward movement of the ratchet-wheel and of the vessel-holder and vessels connected therewith. As the vessel E is thus turned to position to discharge its contents, the vessel E′ will be brought coincident with the induction-channel $d$ and will receive from such channel a supply of liquid in readiness to be discharged when the coin-carrier is again operated. It will be observed that the coin-chute L is mounted loosely upon the shaft or rod I; but the extent of movement of this coin-chute is determined by the lugs $k^2$ on the inner face of the front plate K, and a weak spring V, that has one end connected to the fixed plate N, bears with its opposite end against the runway L′ of the chute, tending to force this chute forward when the coin-carrier with a proper coin therein is moved in forward direction. Hence when the coin-carrier is so moved the chute L is shifted under the action of the spring V, so as to close the coin-slot $k$ of the front plate K, until the coin-carrier is returned to its normal position by the coiled reaction-spring O, when a pin $x$ upon the hub $m'$ of the coin-carrier will engage with a pin $x'$, projecting from the chute L, and cause the chute to be shifted backward until its runway is again coincident with the slot $k$ of the front plate K.

It is manifest that the details of construction above set out may be varied within wide limits without departing from the spirit of my invention, and that certain features of my invention may be employed without its adoption as an entirety either in connection with liquid-dispensing apparatus or in connection with coin-controlled apparatus designed for other purposes.

Having thus described my invention, what I claim as new, and desire to secure by Letters Patent, is—

1. In apparatus of the class described, the combination, with a liquid-delivery pipe or channel and a liquid-discharge pipe or channel, of a series of movable vessels, a handle for moving said vessels coincident with said delivery and discharge pipes or channels, and an intermediate coin-controlled mechanism, whereby said handle may be thrown into engagement with said vessels to shift the same, substantially as described.

2. In apparatus of the class described, the combination, with a liquid-delivery pipe or channel and a liquid-discharge pipe or channel, of a series of rotatable vessels, a rod and handle for rotating said vessels, a coin-carrier connected with said rod, and suitable mechanism connected with said vessels, whereby when a coin is in the seat of the coin-carrier said carrier will engage with and serve to shift said vessels to move the same successively coincident with the delivery and discharge channels, substantially as described.

3. In apparatus of the class described, the combination, with a liquid delivery or induction pipe or channel, of a series of rotatable vessels, a rod and handle for rotating said vessels, a coin-carrier mounted upon and connected to said rod and provided with a seat to receive a coin, suitable devices, such as pawls or dogs, in suitable connection with said vessels for engaging the coin within the coin-carrier, and a suitable releasing-arm for throwing said dogs or pawls out of engagement with the coin, substantially as described.

4. In apparatus of the class described, the combination, with a cover-plate provided with delivery and discharge pipes or channels, of a series of movable vessels, each of which is open at one end and closed at the opposite end, said vessels having their open ends held closely against said plate, said plate serving to close said vessels except when coincident with the delivery and discharge pipes or channels, and a handle for shifting said vessels to bring them coincident with the delivery and discharge pipes or channels, substantially as described.

5. In apparatus of the class described, the combination, with a tank B, of a cover-plate D, provided with the pipes or channels $d$ and $d'$, the vessels E and E′, held against said cover-plate D, a vessel-holder $E^2$, by which said vessels are sustained, a spring $E^3$ for holding said vessels against said cover-plate, a rod I and handle $i$, whereby said vessels may be rotated, and suitable means for effecting the engagement of said rod I with said vessel-holder $E^2$, substantially as described.

6. In apparatus of the class described, the combination, with a cover-plate having a delivery pipe or channel and a discharge pipe or channel therein, of a series of open-ended vessels adapted to be brought coincident with said pipes or channels and a cooling-pipe connected with said discharge pipe or channel, whereby that portion only of the liquid within said cooling-pipe will be chilled, substantially as described.

7. In apparatus of the class described, the combination of a coin-chute, a coin-carrier, an operating-rod whereon said coin-carrier is mounted, a device—such, for example, as a vessel-holder—to be rotated, a suitable engaging pawl or dog upon said device, a releasing device for moving said dog or pawl to release the coin, and a spring for returning said coin-carrier to its normal position, substantially as described.

8. In apparatus of the class described, the combination of a coin-carrier, an operating-rod connected with said coin-carrier to shift the same, a plate provided with a coin-slot, a chute for receiving the coin and delivering it to the coin-carrier, said chute being movably sustained, and a spring for shifting said chute to close the coin-slot, substantially as described.

9. In apparatus of the class described, the combination of a cover-plate provided with an induction or delivery pipe or channel, a series of rotatable vessels adapted to be brought coincident with said pipe or channel, a vessel-holder for said vessels, a rod and handle whereby said vessels are rotated, a coin-carrier mounted upon said rod and provided with a seat for the coin, a ratchet-wheel connected to said vessel-holder, a check-pawl for engagement with said ratchet-wheel, suitable coin-engaging devices upon said ratchet-wheel, and a coiled spring for returning said coin-carrier to its normal position, substantially as described.

10. In apparatus of the class described, the combination of a cover-plate D, provided with pipes or channels $d$ and $d'$, a vessel-holder $E^2$, vessels E and E', carried by said vessel-holder, a ratchet-wheel P, connected to said vessel-holder, an operating-rod I, a coin-carrier M, having a seat $m$, a chute L for delivering the coin to said coin-carrier, a pawl $p$ for engagement with said ratchet-wheel, a spring O for returning said coin-carrier to its normal position, suitable dogs R R' for engaging a coin within the coin-carrier, and a fixed plate N, provided with a releasing-arm for contacting with said pawls or dogs R R' to release the coin, substantially as described.

ROBERT H. LITTLE.

Witnesses:
GEORGE P. FISHER, Jr.,
FRED GERLACH.